United States Patent
Terada et al.

(10) Patent No.: US 6,881,807 B2
(45) Date of Patent: Apr. 19, 2005

(54) ADDITION-CURABLE SILICONE GEL COMPOSITION

(75) Inventors: Masayoshi Terada, Chiba (JP); Hiroji Enami, Chiba (JP)

(73) Assignee: Dow Corning Toray Silicone Co., Ltd. (JP)

( * ) Notice: Subject to any disclaimer, the term of this patent is extended or adjusted under 35 U.S.C. 154(b) by 0 days.

(21) Appl. No.: 10/476,055

(22) PCT Filed: Apr. 15, 2002

(86) PCT No.: PCT/JP02/03744

§ 371 (c)(1),
(2), (4) Date: Oct. 20, 2003

(87) PCT Pub. No.: WO02/088252

PCT Pub. Date: Nov. 7, 2002

(65) Prior Publication Data

US 2004/0147702 A1 Jul. 29, 2004

(30) Foreign Application Priority Data

Apr. 26, 2001 (JP) ........................ 2001-128722

(51) Int. Cl.$^7$ .............................................. C08G 77/12
(52) U.S. Cl. ............................ 528/31; 528/34; 528/15; 528/32; 528/18
(58) Field of Search .............................. 528/34, 15, 32, 528/31, 18

(56) References Cited

U.S. PATENT DOCUMENTS

| 4,743,474 | A | | 5/1988 | Homan |
| 5,204,437 | A | | 4/1993 | Ikeno et al. |
| 5,432,280 | A | | 7/1995 | Hara et al. |
| 6,025,435 | A | * | 2/2000 | Yamakawa et al. ......... 524/862 |

FOREIGN PATENT DOCUMENTS

| EP | 0 596 534 | 5/1994 |
| EP | 0 661 335 | 7/1995 |

* cited by examiner

Primary Examiner—Kuo-Liang Peng
(74) Attorney, Agent, or Firm—Robert L. McKellar; McKellar IP Law, PLLC

(57) ABSTRACT

A silicone gel composition is characterized by excellent storage stability in a non-cured state and by high adhesion to a substrate and long-term stability of consistency at elevated temperatures after curing. The silicone gel composition comprises: a polyorganosiloxane (A), which consists of polyorganosiloxane (A-1) that contains $R(CH_3)_2SiO_{2/2}$ units, $RsiO_{3/2}$ units $R(CH_3)_2SiO_{1/2}$ units, and polydiorganosiloxane (A-2) that contains $R(CH_3)_2SiO_{2/2}$ units and $R(CH_3)_2SiO_{1/2}$ units, and $R(CH_3)$ which contains in one molecule two silicon-bonded hydrogen atoms; an addition-reaction platinum catalyst (C); an organosilicon compound (D) selected from silane of the general formula $(R^1O)_nSiR^2_{4-n}$ or a partially hydrolyzed condensate thereof; and an organic titanium compound (E).

15 Claims, No Drawings

ADDITION-CURABLE SILICONE GEL COMPOSITION

TECHNICAL FIELD

The present invention relates to an addition-curable silicone gel composition, in particular, to a silicone gel composition which is characterized by high storage stability, improved adhesion to a substrate in a cured state, and capability of forming a silicone gel having consistency stable over a long period of time and under an elevated environmental temperature.

BACKGROUND ART

Due to good stress-relaxation, electrical, heat-resistant, and weather proof properties of cured compounds produced from silicone gel compositions, these compositions find wide application for preparation of fillers and sealants used in electric and electronic devices. An example of such a silicone gel composition is the one having a branch-structured polyorganosiloxane having a molecular terminal capped with a silicon-bonded vinyl group, a polydiorganosiloxane having both molecular terminals capped with silicon-bonded vinyl groups, a polyorganosiloxane having silicon-bonded hydrogen atoms only on both molecular terminals, and a platinum catalyst (see Japanese Patent Application Publication No. Sho 62-181357).

However, a silicone gel obtained by curing the aforementioned composition has poor adhesion to a substrate and can be easily peeled off from the substrate under the effect of heat cycles and physical stress. It has been proposed to overcome the above drawback by using a silicone gel composition improved either by adding siloxane units having alkoxy or epoxy groups to the base polymer or to a cross-linking agent (see Japanese Patent Application Publication No. Hei 4-88060). Another method is based on the use of a silicone gel composition based on the addition of an aluminum organic compound and an alkoxyalkyl silane compound to a specific polyorganosiloxane compound (see Japanese Patent Application Publication No. Hei 6-107947), or on the use of a polyorganosiloxane composition that contains a chain extender having in one molecule two silicon-bonded hydrogen atoms, a cross-linking agent with at least three silicon-bonded hydrogen atoms in one molecule, an alkylpolysilicate, and an alkyl titanate (see Japanese Patent Application Publication No. Hei 7-233326).

However, improvement achieved in thermal stability and in adhesion of a silicone gel obtained by curing the above composition to a substrate is not sufficient, and when such silicone gel is maintained over a long period of time at relatively high temperatures that exceed 180° C., it begins to lose its consistency, i.e., becomes harder, can easily be peeled off the substrate, and forms "cracks" in the gel. Furthermore, if a silicone gel composition contains an organoaluminum compound, long-term storage of this composition prior to curing causes precipitation and separation of the organoaluminum compound.

DISCLOSURE OF INVENTION

The inventors carried out a study aimed at the solution of the problems associated with this technique. As a result of this study, they arrived at the present invention. More specifically, it is an object of the present invention to provide a silicone gel composition, which is characterized by excellent storage stability in a non-cured state and by strong adhesion to a substrate and by long-term stability of consistency at elevated temperatures after curing.

The present invention provides a silicone gel composition which comprises:

100 parts by weight of a polyorganosiloxane (A), which has a viscosity from 10 to 100,000 mPa·s at 25° C. and contains 20 to 100 wt. % polyorganosiloxane (A-1) that contains 80.0 to 99.8 mole % of $R(CH_3)SiO_{2/2}$ units, 0.1 to 10.0 mole % of $RSiO_{3/2}$ units, and 0.1 to 10.0 mole % of $R(CH_3)_2SiO_{1/2}$ units (where R is a monovalent hydrocarbon and where alkenyl groups constitute 0.25 to 4.0 mole % of the entire R), and 0 to 80 wt. % polydiorganosiloxane (A-2) that contains 90.0 to 99.9 mole % of $R(CH_3)SiO_{2/2}$ units and 0.1 to 10.0 mole % of $R(CH_3)_2SiO_{1/2}$ units (where R is a monovalent hydrocarbon and where alkenyl groups constitute 0.25 to 4.0 mole % of the entire R);

a polyorganosiloxane (B), which has a viscosity from 2 to 10,000 mPa·s at 25° C. and contains in one molecule at least two silicon-bonded hydrogen atoms, the aforementioned polyorganosiloxane (B) being used in such an amount that a mole ratio of silicon-bonded hydrogen atoms contained in this component is within the range of 0.8 to 1.2 relative to the amount of alkenyl groups in component (A);

an addition-reaction platinum catalyst (C) used in such an amount that in terms of weight units the metallic platinum constitutes 0.01 to 1000 ppm per total weight of components (A) and (B);

0.05 to 20 parts by weight of an organosilicon compound (D) selected from a silane of the general formula $(R^1O)_nSiR^2_{4-n}$ and a partially hydrolyzed condensate thereof (in the aforementioned formula, $R^1$ is a alkyl or an alkoxyalkyl group, $R^2$ is a substituted or non-substituted monovalent hydrocarbon group, and "n" is 3 or 4); and 0.001 to 5 parts by weight of an organic titanium compound (E), wherein none of the polyorganosiloxane, except for component (B), contains silicon-bonded hydrogen atom;

the aforementioned silicone gel composition having a cured-state 1/4 consistency, as specified by JIS K 2220, within the range of 10 to 200.

The silicone gel composition of the present invention will be further described in more detail.

A polyorganosiloxane (A) is the main component of the composition of the invention. This component contains 20 to 100 wt. % polyorganosiloxane (A-1) containing $R(CH_3)SiO_{2/2}$ units, $RSiO_{3/2}$ units, and $R(CH_3)_2SiO_{1/2}$ units and 0 to 80 wt. % polydiorganosiloxane (A-2) containing $R(CH_3)SiO_{2/2}$ units and $R(CH_3)_2SiO_{1/2}$ units. If the content of constituent (A-1) is less then 20 wt. %, the obtained composition might not cure sufficiently. If necessary, the entire component (A) may consist of constituent (A-1). It is recommended for component (A) to have viscosity of 10 to 100,000 mPa·s. If viscosity is below the lower limit of the aforementioned range, the composition either will become too fluid in a non-cured state, or will acquire insufficient physical properties after curing. In case the viscosity exceeds the upper limit, the composition will become difficult to handle and degas during production.

Constituent (A-1) contains $R(CH_3)SiO_{2/2}$, $RSiO_{3/2}$, and $R(CH_3)_2SiO_{1/2}$ units. Constituent (A-1) may contain only the aforementioned three units. If necessary, however, one or two, or more than two of the following other units can be added to this constituent in small quantities: $HO(CH_3)_2SiO_{1/2}$, $RO(CH_3)_2SiO_{1/2}$, $HO(CH_3)SiO_{2/2}$, and $RO(CH_3)SiO_{2/2}$. In the above formulae, R is a monovalent hydrocarbon that can be represented by methyl, ethyl, propyl, butyl, pentyl, hexyl, heptyl, octyl, nonyl, decyl, octadecyl or similar alkyl groups; cyclopentyl, cyclohexyl, or similar cycloalkyl groups; phenyl, tolyl, xylyl, naphthyl, or similar aryl groups; benzyl, phenethyl, phenylpropyl, or similar aralkyl groups; 3-chloropropyl, 3,3,3-trifluoropropyl, or similar halogenated alkyl groups. Preferable among these are methyl and phenyl groups. Alkenyl groups should constitute 0.25 to 4.0 mole % of the entire R. If the amount of alkenyl groups in R is below the recommended lower limit, the obtained composition will not possess sufficient curability. If, on the other hand, the amount of alkenyl group exceeds the upper limit, it would be difficult to produce a cured body in a gel-like state. The following are examples of recommended alkenyl groups: a vinyl, allyl, butenyl, pentenyl, or a hexenyl group. Most preferable is a vinyl group.

It is recommended that constituent (A-1) contain 80.0 to 99.8 mole % of $R(CH_3)SiO_{2/2}$ units, 0.1 to 10.0 mole % of $RSiO_{3/2}$ units, and 0.1 to 10.0 mole % of $R(CH_3)_2SiO_{1/2}$ units. If the content of $RSiO_{3/2}$ units is below the lower limit of the recommended range, it would be difficult to cure the composition to a sufficient degree. If the content of these units exceeds the upper limit of the range, the obtained composition will become too viscous and will possess low flowability. Although there are no special limitations with regard to viscosity of constituent (A-1), it is preferable if viscosity of this constituent is within the range of 10 to 10,000 mPa·s.

Constituent (A-2) is a polydiorganosiloxane which contains $R(CH_3)SiO_{2/2}$ units and $R(CH_3)_2SiO_{1/2}$ units. This constituent may contain only the aforementioned two groups. If necessary, however, one or two, or more than two of the following other units can be added to this constituent in small quantities: $HO(CH_3)_2SiO_{1/2}$, $RO(CH_3)_2SiO_{1/2}$, $HO(CH_3)SiO_{2/2}$, and $RO(CH_3)SiO_{2/2}$. In these formulae, R has the same meaning as defined earlier. It is recommended that constituent (A-2) contain 90.0 to 99.9 mole % of $R(CH_3)SiO_{2/2}$ units and 0.1 to 10.0 mole % of $R(CH_3)_2SiO_{1/2}$ units. Although there are no special limitations with regard to viscosity of constituent (A-2), it is preferable if viscosity of this constituent is within the range of 100 to 100,000 mPa·s.

Polyorganosiloxane of component (B) is used for cross-linking and curing of the composition of the invention into a gel-like substance due to hydrosilation reaction. Component (B) is characterized by having two silicon-bonded hydrogen atoms in one molecule. If the number of silicon-bonded hydrogen atoms in one molecule is less than 2, the obtained silicone gel composition will not possess sufficient curability, and after curing it could be easily peeled off from a substrate. If, on the other hand, the number of silicon-bonded hydrogen atoms exceeds 2, the silicone gel obtained after curing the silicone gel composition of the invention will have low resistance to heat.

Component (B) may have a linear, partially-branched linear, branched, cyclic, or resin-like molecular structure. Hydrogen atoms can be bonded to silicon at molecular terminals or at sides of the molecular chain. Apart from hydrogen atoms, the following organic groups can be bonded to silicon atoms in component (B): methyl, ethyl, propyl, butyl, pentyl, hexyl, heptyl, octyl, nonyl, decyl, octadecyl or similar alkyl groups; cyclopentyl, cyclohexyl, or similar cycloalkyl groups; phenyl, tolyl, xylyl, naphthyl, or similar aryl groups; benzyl, phenethyl, phenylpropyl, or similar aralkyl groups; 3-chloropropyl, 3,3,3-trifluoropropyl, or similar halogenated alkil groups. Preferable among these are methyl groups and phenyl groups.

It is recommended for component (B) to have viscosity within the range of 2 to 10,000 mPa·s at 25° C. Viscosity at 25° C. below the lower limit will impair storage stability and handling of the composition under industrial conditions. On the other hand, if viscosity exceeds the upper limit, this also will impair handling of the composition during use in the production process. Component (B) can be represented by a copolymer of a methylhydrogensiloxane and a dimethylsiloxane having both molecular terminals capped with trimethylsiloxy groups, a dimethylpolysiloxane having both molecular terminals capped with dimethylhydrogensiloxy groups, a polyorganosiloxane that consists of $(CH_3)_3SiO_{1/2}$, $(CH_3)_2 HSiO_{1/2}$, and $SiO_{4/2}$, units, a polyorganosiloxane that consists of $(CH_3)_3 SiO_{1/2}$, $(CH_3)_2 HSiO_{1/2}$, $(CH_3)_2 SiO_{2/2}$, and $SiO_{4/2}$ units, or mixtures of the aforementioned polyorganosiloxanes. Most preferable among the above is a dimethylsiloxane having both molecular terminals capped with dimethylhydrogensiloxy groups.

It is recommended that component (B) be used in such an amount that a mole ratio of silicon-bonded hydrogen atoms contained in this component is within the range of 0.8 to 1.2, preferably 0.9 to 1.1, relative to the amount of silicon-bonded alkenyl groups in component (A). If the aforementioned mole ratio of silicon-bonded hydrogen amounts in component (B) to silicon-bonded alkenyl groups in component (A) is below the minimal limit of the above range, either the obtained composition will not be sufficiently curable and will not exhibit sufficient viscosity during curing, or the silicone gel obtained after curing will not possess sufficient adhesion to the substrate. In both cases, the silicone gel obtained after curing will have low thermal stability.

Component (C) is an addition-reaction platinum catalyst intended to promote addition of silicon-bonded hydrogen atoms of component (B) to silicon-bonded alkenyl groups of component (A). This platinum catalyst can be represented by a platinum black, platinum-carrying activated carbon, platinum-carrying fine silica powder, chloroplatinic acid, an alcoholic solution of chloroplatinic acid, a platinum-olefin complex, a platinum-alkenylsiloxane complex, and a fine thermoplastic resin powder that contains a platinum-type catalyst. The aforementioned thermoplastic resin may comprise a silicone resin, polycarbonate resin, acryl resin, nylon resin, or a polyester resin. It is recommended that the aforementioned resin have a softening point of 5 to 200° C. and have diameter of particles within the range of 0.01 to 10 micrometers.

It is recommended to use component (C) in such an amount that in terms of weight units the metallic platinum constitutes 0.01 to 1000 ppm, preferably 0.1 to 100 ppm, per total weight of components (A) and (B). If the amount is below the lower limit, the obtained composition will not be sufficiently curable. If the amount of the catalyst exceeds the recommended upper limit, the use of the surplus will not practically accelerate the curing procedure and will not be justifiable economically.

Organosilicon compound (D) selected from silane of the general formula $(R^1O)_nSiR^2_{4-n}$, or a partially hydrolyzed condensate thereof, is needed for improving adhesion of the silicone gel produced by curing to a substrate. In the aforementioned formula, $R^1$ is a alkyl or an alkoxyalkyl group, $R^2$ is a substituted or non-substituted monovalent hydrocarbon group, and "n" is 3 or 4. Alkyl groups designated by $R^1$ can be the same or different and can have 1 to 4 carbon atoms. Alkyl groups are represented by methyl groups, ethyl groups, or propyl groups. An example of an alkoxyalkyl group designated by $R^1$ is methoxyethyl. Monovalent hydrocarbon groups represented by $R^2$ can be represented by methyl, ethyl, propyl, butyl, pentyl, hexyl, heptyl, octyl, nonyl, decyl, octadecyl or similar alkyl groups; cyclopentyl, cyclohexyl, or similar cycloalkyl groups; phenyl, tolyl, xylyl, naphthyl, or similar aryl groups; benzyl, phenethyl, phenylpropyl, or similar aralkyl groups; 3-chloropropyl, 3,3,3-trifluoropropyl, or similar halogenated alkyl groups. Preferable among these are alkyl groups having 1 to 4 carbon atoms, 3,3,3-trifluoropropyl, or phenyl group, but most preferable are methyl groups.

The aforementioned partially hydrolyzed condensate of silane may have a linear, branched, cyclic, or net-like molecular structure. Furthermore, it can be a monomer or a copolymer. The aforementioned partially hydrolyzed condensate of silane can be represented by the following general formula: $(R^1O)_{2\ (m+1)}Si_mO_{m-1}$, wherein $R^1$ is the same as defined above, and m is an integer from 2 to 20. This component should have viscosity of 0.1 mPa·s to 100 mPa·s at 25° C.

It is recommended to use component (D) in an amount of 0.05 to 20 parts by weight, preferably 0.1 to 100 parts by weight, and even more preferably 0.2 to 2 parts by weight, per 100 parts by weight of component (A). If component (D) is used in an amount that is below the lower limit, the cured silicone gel will not exhibit sufficient adhesion to the substrate. If the content of component (D) exceeds the recommended upper limit, either the composition will not have storage stability, or the silicone gel obtained after curing will have unattractive appearance.

Organic titanium compound (E) protects the silicone gel from a decrease in thermal stability, which may be caused by addition of component (D). The following are examples of component (E): tetrabutyl titanate, tetraisopropyl titanate, tetraoctyl titanate, tetraphenyl titanate, or a similar organic titanic acid ester; diisopropoxy-bis (acetylacetonate) titanium, diisopropoxy-bis (ethylacetoacetate) titanium, or a similar organic titanium chelate.

It is recommended that component (E) be used in an amount of 0.001 to 5 parts by weight, preferably 0.01 to 1 part by weight per 100 parts by weight of component (A). If component (E) is used in an amount less than the lower limit of the above range, the silicone gel obtained after curing will not acquire sufficient thermal resistance. If component (E) is used in an amount exceeding the recommended upper limit, the obtained silicone gel will lose its storage stability.

In order to improve handling of the composition of the invention under industrial conditions, some additional components can be added to this composition. The following addition reaction inhibitors are examples of such additional components: 3-methyl-1-butyn-3-ol, 3,5-dimethyl-1-hexyn-3-ol, 3-phenyl-1-butyn-3-ol, or a similar acetylene-type compound, 3-methyl-3-penten-1-yl, 3,5-dimethyl-3-hexen-1-yl, or a similar enyne compound; 1,3,5,7-teramethyl-1,3,5,7-tetravinyl cyclotetrasiloxane, 1,3,5,7-tetramethyl-1,3,5,7-tetrahexenyl cyclotetrasiloxane, or a similar cycloalkenyl siloxane; benzotriazole, or a similar triazole compound. It is recommended that such inhibitors being used in an amount of 0.001 to 5 parts by weight per 100 pats by weight of component (A).

If necessary, the silicone gel composition of the invention can contain other additives used in quantities not detrimental to the purposes of the present invention. Examples of such additives are the following: dry-process fine silica powder, wet-process fine silica powder, fine quartz powder, fine powder of calcium carbonate, fine powder of titanium dioxide, fine powder of diatomaceous earth, fine powder of aluminum oxide, fine powder of aluminum hydroxide, fine powder of zinc oxide, fine powder of zinc carbonate, or a similar inorganic filler; the aforementioned powdered fillers surface-treated with the following substances: methyltrimethoxysilane, vinyltrimethoxyethoxysilane, or a similar organoalkoxysilane; trimethylchlorosilane or a similar organohalosilane; hexamethyldisilazane, or a similar organosilazane; dimethylsiloxane oligomer having both molecular terminals capped with hydroxyl groups, methylphenylsiloxane oligomer having both molecular terminals capped with hydroxyl groups, methylvinylsiloxane oligomer having both molecular terminals capped with hydroxyl groups, or similar siloxane oligomers; higher fatty acids, or their metal salts. The composition of the invention may contain also toluene, xylene, acetone, methylethylketone, methylisobutylketone, hexane, heptane, or a similar organic solvent; polydimethylsiloxane having both molecular terminals capped with trimethylsiloxy groups, polymethylphenylsiloxane having both molecular terminals capped with trimethylsiloxy groups, or a similar non-cross-linkable polyorganosiloxane; flame-retarding agents, heat-resistant agents, plasticizers, agents for imparting thixotropic properties, adhesion enhancing agents, anticorrosive agents, pigments, dyes, fluorescent dyes, etc.

The silicone gel composition of the invention is prepared by uniformly mixing aforementioned components (A) to (E). The silicone gel composition of the invention can be stored in the form of two liquid subcompositions, i.e., a first liquid subcomposition (I) consisting of components (A), (C), and (E), i.e., without components (B) and (D), and a second liquid subcomposition (II) consisting of components (A), (B) and (D), i.e., without components (C) and (E) {component (A) can be present in both liquid mixtures}. Prior to use, the aforementioned liquid subcompositions should be uniformly mixed. If necessary, the silicone gel composition of the invention can be stored in the form of a single liquid composition, but storing in the aforementioned two-liquid form provides better protection against curing during storage and against deterioration of adhesive properties.

The silicone gel composition of the invention should have a cured-state 1/4 consistency, as specified by JIS K 2220, within the range of 10 to 200, preferably within the range of 20 to 150. If this characteristic is below the lower limit of the above range, the silicone gel obtained from the composition will exhibit a decrease in stress-relaxation properties and will be prone to formation of "cracks". If, on the other hand, the cured-state 1/4 consistency exceeds the upper limit of the recommended range, the silicone gel will become flowable under the effect of vibrations.

There are no special limitations with regard to the procedure suitable for curing the silicone gel composition of the present invention. For example, the composition can be poured into an appropriate form or spread over the surface of a substrate as a coating and cured by retaining it at room temperature, or by heating at 50° C. to 200° C.

The silicone gel composition of the invention is normally used as a filler or sealant for electrical and electronic devices of high reliability. In particular, the silicone gel composition of the invention exhibits excellent adhesion to the materials: gold, silver, copper, nickel, aluminum, or similar metals used for manufacture of electrodes; poly-phenylene sulfide (PPS), polybutyleneterephthalate (PBT), or other engineering plastics used for manufacture of cases; epoxy resin, polyimide resin or similar thermosetting resins used for manufacture of printed circuit boards; ceramics such as alumina, alumina nitride, or the like; and substrates from various materials.

BEST MODE FOR CARRYING OUT THE INVENTION

The silicone gel composition of the invention will be described in detail with reference to practical examples.

Viscosity given in these examples relates to values at 25° C. Furthermore, the following methods were used for measuring adhesion strength, cured-state 1/4 consistency, and heat-resistant properties of the silicone gel composition of the invention.

Adhesion Strength of Silicone Gel

A specimen for adhesion strength test was prepared by arranging two 100-mm long, 25-mm wide, and 1-mm thick plates parallel to each other, spacing them so that, after filling with the silicone gel composition, the layer formed by the composition was 25 mm long, 10 mm wide, and 1 mm thick, and curing the layer for 60 min. at 70° C. Adhesion strength was measured by stretching the obtained specimen at a rate of 5 mm/min. in a direction perpendicular to the adhered surfaces.

Cured-State 1/4 Consistency

A silicone gel composition was slowly poured into a 50 ml glass flask and formed into a silicone gel by heating for 1 hour at 70° C. Cured-state 1/4 consistency of the obtained gel was measured in accordance with the provisions of JIS K 2220.

Thermal Resistance of Silicone Gel

A silicone gel obtained after curing by the method described above was retained in an oven for 400 hours at 200° C. and then removed and cooled to 25° C. at room temperature. After such treatment, cured-state 1/4 consistency of the gel was measured in accordance with the provisions of JIS K 2220.

Practical Examples 1 to 3, Comparative Example 1 to 7

Components shown in Table 1 (in parts by weight) were uniformly mixed and produced in the form of 10 different silicone gel compositions. These silicone gel compositions were retained intact for 3 days at 5° C. and then checked with regard to storage stability by observing formation of a precipitate. In addition to storage stability, the composition was tested with regard to adhesion strength, cured-state 1/4 consistency, and resistance to heat.

In the attached table, SiH/SiCH=CH$_2$ is presented in terms of a mole number of silicon-bonded hydrogen atoms contained in component (b-1) or/and component (b-2) in a ratio to 1 mole of vinyl groups in components (a-1), (a-2) or/and (a-3).

Component (a-1) is a polyorganosiloxane (with 0.23 wt. % of vinyl groups) having viscosity 680 mPa·s and consisting of 93.5 mole % $(CH_3)_2SiO_{2/2}$ units, 3.3 mole % $CH_3SiO_{3/2}$ units, 2.3 mole % $(CH_3)_3SiO_{1/2}$ units, and 0.9 mole % $(CH_3)_2(CH_2=CH)SiO_{1/2}$ units.

Component (a-2) is a 400 mPa·s viscosity dimethylpolysiloxane having both molecular terminals capped with dimethylvinylsiloxy groups (0.41 wt. % of vinyl groups) and consisting of 98.5 mole % $(CH_3)_2SiO_{2/2}$ units and 1.5 mole % $(CH_3)_2(CH_2=CH)SiO_{1/2}$ units.

Component (a-3) is a 800 mPa·s viscosity dimethylpolysiloxane having both molecular terminals capped with trimethoxysiloxy groups and consisting of 98.9 mole % $(CH_3)_2SiO_{2/2}$ units and 1.1 mole % $(CH_3O)_3SiO_{1/2}$ units.

Component (b-1) is a 16 mPa·s viscosity dimethylpolysiloxane having both molecular terminals capped with dimethylhydrogensiloxy groups (0.13 wt. % content of silicon-bonded hydrogen).

Component (b-2) is a 4 mPa·s viscosity copolymer of a methylhydrogensiloxane and a dimethylsiloxane having both molecular terminals capped with trimethylsiloxy groups (0.78 wt. % content of silicon-bonded hydrogen).

Component (c) is a complex of platinum with 1,3-divinyl-1,1,3,3-tetramethyldisiloxane with 5 wt. % of metallic platinum (2.48% content of vinyl groups).

Component (d-1) is an ethylpolysilicate [general molecular formula $Si_mO_{(m-1)}(OC_2H_5)_{2(m+1)}$, where an average value of "m" is 5), 40 wt % content of $SiO_2$, viscosity 5 mPa·s].

Component (d-2) is methyltrimethoxysilane.

Component (e-1) is diisopropoxy bis(ethylacetoacetate) titanium.

Component (e-2) is tetrabutyltitanate.

Component (e-3) is aluminum acetylacetonate.

TABLE 1

|  |  | Practical Examples | | | Comparative Examples | | | | | | |
| --- | --- | --- | --- | --- | --- | --- | --- | --- | --- | --- | --- |
|  |  | 1 | 2 | 3 | 1 | 2 | 3 | 4 | 5 | 6 | 7 |
| Composition | Component (a-1) | 50 | 100 | 100 | 50 | 50 | 50 | 50 | 50 | 50 | — |
| (parts | Component (a-2) | 50 | — | — | 50 | 25 | 50 | 50 | 50 | 50 | 100 |
| by | Component (a-3) | — | — | — | — | 25 | — | — | — | — | — |
| weight) | Component (b-1) | 9.3 | 6.5 | 6.5 | 9.4 | 6.3 | 9.5 | 9.6 | 9.7 | 9.8 | 6.3 |
|  | Component (b-2) | — | — | — | — | — | — | — | — | — | 0.6 |
|  | Component (c) | 0.1 | 0.1 | 0.1 | 0.1 | 0.1 | 0.1 | 0.1 | 0.1 | 0.1 | 0.1 |
|  | Component (d-1) | 0.5 | 0.5 | — | — | — | 0.5 | 0 | 0.01 | 0.5 | 0.5 |
|  | Component (d-2) | — | — | 0.5 | — | — | — | — | — | — | — |
|  | Component (e-1) | 0.02 | 0.02 | — | — | — | — | 0.02 | 0.02 | — | 0.02 |
|  | Component (e-2) | — | — | 0.02 | — | — | — | — | — | — | — |
|  | Component (e-3) | — | — | — | — | — | 0.05 | — | — | — | — |
| SiH/SiCH=CH$_2$ |  | 0.99 | 0.99 | 0.99 | 1.00 | 0.99 | 1.01 | 1.02 | 1.03 | 1.04 | 0.81 |
| Adhesive | Copper | 200 | 190 | 175 | 80 | 150 | 200 | 75 | 80 | 180 | 180 |
| Strength | Nickel | 190 | 180 | 185 | 50 | 120 | 160 | 55 | 50 | 130 | 130 |
| (gf) | Polybutyleneterephthalate resin | 175 | 165 | 190 | 40 | 100 | 150 | 45 | 50 | 140 | 140 |
|  | Alumina plate | 220 | 210 | 215 | 170 | 195 | 210 | 190 | 180 | 195 | 195 |
| Resistance to heat | Cured-state 1/4 consistency in initial period | 60 | 70 | 72 | 60 | 96 | 63 | 64 | 65 | 62 | 70 |
|  | Cured-state 1/4 consistency after 200° C. × 500 hrs | 58 | 68 | 68 | 55 | 20 | 20 | 55 | 58 | 10 | 10 |
| Storage Stability | Existence of precipitation | No | No | No | No | No | Yes | No | No | No | No |

Thus it has been shown that the gel composition of the present invention exhibits excellent stability in storage, and the silicone gel obtained by curing the composition has good adhesion to various substrates and preserves its cured-state

What is claimed is:

1. A silicone gel composition comprising:
   (A) 100 parts by weight of a polyorganosiloxane having a viscosity from 10 to 100,000 mPa·s at 25° C., where polyorganosiloxane (A) comprises
      (i) 20 to 100 wt. % polyorganosiloxane that contains 80.0 to 99.8 mole % of $R(CH_3)SiO_{2/2}$ units, 0.1 to 10.0 mole % of $RSiO_{3/2}$ units, and 0.1 to 10.0 mole % of $R(CH_3)_2SiO_{1/2}$ units, where R is selected from the group consisting of monovalent hydrocarbon groups and alkenyl groups, wherein the alkenyl groups comprise 0.25 to 4.0 mole % of R, and
      (ii) 0 to 80 wt. % polydiorganosiloxane that contains 90.0 to 99.9 mole % of $R(CH_3)SiO_{2/2}$ units and 0.1 to 10.0 mole % of $R(CH_3)_2SiO_{1/2}$ units;
   (B) a polyorganosiloxane that has a viscosity of from 2 to 10,000 mPa·s at 25° C. and contains in one molecule two silicon-bonded hydrogen atoms, said polyorganosiloxane (B) being used in an amount such that a mole ratio of silicon-bonded hydrogen atoms contained in component (B) is within the range of 0.8 to 1.2 relative to amount of alkenyl groups in component (A);
   (C) a platinum catalyst used in such an amount that in terms of weigth units the metallic platinum constitutes 0.01 to 1000 ppm per total weight of components (A) and (B);
   (D) 0.05 to 20 parts by weight of an organosilicon compound selected from a group consisting of a silane of the general formula $(R^1O)_nSiR^2_{4-n}$ and a partially hydrolyzed condensate thereof, where $R^1$ is an alkyl or an alkoxyalkyl group, $R^2$ is a substituted or non-substituted monovalent hydrocarbon group, and n is 3 or 4; and
   (E) 0.001 to 5 parts by weight of an organic titanium compound, wherein (B) is the only component that contains silicon-bonded hydrogen atom,
   said silicone gel composition having a cured-state 1/4 consistency within the range of 10 to 200 as specified JIS K 2220.

2. The silicone gel composition as claimed in claim 1 wherein component (D) is selected from the group consisting of an alkyl silicate and alkyl polysilicate.

3. The silicone gel composition as claimed in claim 1 wherein polyorganosiloxane A(i) further comprises any one or a combination of the units $HO(CH_3)_2SiO_{1/2}$, $RO(CH_3)_2SiO_{1/2}$, $HO(CH_3)SiO_{2/2}$, and $RO(CH_3)SiO_{2/2}$.

4. The silicone gel composition as claimed in claim 1 wherein the monovalent hydrocarbon for R is selected from the group consisting of methyl and phenyl groups.

5. The silicone gel composition as claimed in claim 1 wherein the alkenyl group is vinyl.

6. The silicone gel composition as claimed in claim 1 wherein polydiorganosiloxane A(ii) further comprises any one or a combination of the units $HO(CH_3)_2SiO_{1/2}$, $RO(CH_3)_2SiO_{1/2}$, $HO(CH_3)SiO_{2/2}$, and $RO(CH_3)SiO_{2/2}$.

7. The silicone gel composition as claimed in claim 1 wherein component (B) is selected from the group consisting of a copolymer of a methylhydrogensiloxane and a dimethylsiloxane having both molecular terminals capped with trimethylsiloxy groups, a dimethylpolysiloxane having both molecular terminals capped with dimethylhydrogensiloxy groups, a polyorganosiloxane comprising $(CH_3)_3SiO_{1/2}$, $(CH_3)_2HSiO_{1/2}$, and $SiO_{4/2}$, units; a polyorganosiloxane comprising $(CH_3)_3SiO_{1/2}$, $(CH_3)_2HSiO_{1/2}$, $(CH_3)_2SiO_{2/2}$, and $SiO_{4/2}$ units mixtures thereof.

8. The silicone gel composition as claimed in claim 1 wherein the amount of component (B) is such that a mole ratio of silicon-bonded hydrogen atoms contained in this component is within the range of 0.9 to 1.1 relative to the amount of silicon-bonded alkenyl groups in component (A).

9. The silicone gel composition as claimed in claim 1 wherein component (C) is selected from the group consisting of platinum black, platinum-carrying activated carbon, platinum-carrying fine silica powder, chloroplatinic acid, an alcoholic solution of chloroplatinic acid, a platinum-olefin complex, a platinum-alkenylsiloxane complex, and a fine thermoplastic resin powder that contains a platinum-type catalyst.

10. The silicone gel composition as claimed in claim 1 wherein the amount of component (C) is 0.1 to 100 ppm, per total weight of components (A) and (B).

11. The silicone gel composition as claimed in claim 1 wherein the amount of organosilicon compound (D) is 0.1 to 10 parts by weight per 100 parts by weight of component (A).

12. The silicone gel composition as claimed in claim 1 wherein component (E) is selected from the group consisting of an organic titanic acid ester or an organic titanium chelate.

13. The silicone gel composition as claimed in claim 1 wherein the amount of component (E) is 0.01 to 1 part by weight per 100 parts by weight of component (A).

14. The silicone gel composition as claimed in claim 1 further comprising at least one component selected from the group consisting of an addition reaction inhibitor, an inorganic filler, an organic solvent, a non-cross-linkable polyorganosiloxane, a flame-retarding agent, a heat-resistant agent, a plasticizer, an agent for imparting thixotropic properties, an adhesion enhancing agent, an anticorrosive agent, a pigment, a dye, a fluorescent dye, or combinations thereof.

15. The silicone gel composition as claimed in claim 1 wherein the composition comprises:
   (I) a first subcomposition consisting of component (A), component (C), and component (E) and
   (II) a second subcomposition consisting of component (A), component (B), and component (D).

* * * * *